(12) United States Patent
Musgrave et al.

(10) Patent No.: US 9,570,019 B2
(45) Date of Patent: Feb. 14, 2017

(54) SYSTEM AND METHOD FOR COORDINATING IMAGE CAPTURE IN A CAMERA HIDDEN BEHIND A DISPLAY DEVICE

(71) Applicant: Dell Products, LP, Round Rock, TX (US)

(72) Inventors: Kenneth C. Musgrave, Austin, TX (US); Andrew T. Sultenfuss, Leander, TX (US); Deeder M. Aurongzeb, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 51 days.

(21) Appl. No.: 14/220,789

(22) Filed: Mar. 20, 2014

(65) Prior Publication Data
US 2015/0271392 A1    Sep. 24, 2015

(51) Int. Cl.
| | |
|---|---|
| G09G 3/36 | (2006.01) |
| G09G 3/34 | (2006.01) |
| H04N 7/14 | (2006.01) |
| G06F 3/00 | (2006.01) |
| G09G 3/3208 | (2016.01) |
| H04N 5/235 | (2006.01) |
| G09G 3/32 | (2016.01) |

(52) U.S. Cl.
CPC ........ *G09G 3/36* (2013.01); *G06F 3/00* (2013.01); *G09G 3/3208* (2013.01); *G09G 3/3406* (2013.01); *H04N 7/144* (2013.01); *G09G 2320/0626* (2013.01); *G09G 2340/0435* (2013.01); *H04N 5/2351* (2013.01)

(58) Field of Classification Search
CPC ............ H04N 5/23222; H04N 5/23293; H04N 5/2351; G09G 3/3208
See application file for complete search history.

(56) References Cited

U.S. PATENT DOCUMENTS

| | | | |
|---|---|---|---|
| 7,443,697 B2 | 10/2008 | Kim et al. | |
| 7,880,829 B2 | 2/2011 | Park et al. | |
| 2007/0008341 A1* | 1/2007 | Endo | G06T 19/006 345/633 |
| 2011/0279689 A1* | 11/2011 | Maglaque | 348/207.1 |
| 2012/0162242 A1* | 6/2012 | Amano et al. | 345/592 |
| 2012/0206603 A1* | 8/2012 | Rekimto et al. | 348/156 |
| 2013/0094126 A1* | 4/2013 | Rappoport et al. | 361/679.01 |

(Continued)

OTHER PUBLICATIONS

"46" 46OUT-B Super Narrow Bezel Display, Samsung, Dec. 12, 2013 http://www.samsung.com/uk/consumer/pc-peripherals/professional-lfd-displays/performance/LH46CBQLBB/EN-features.

*Primary Examiner* — Christopher K Peterson
(74) *Attorney, Agent, or Firm* — Prol Intellectual Property Law, PLLC; H. Kenneth Prol

(57) ABSTRACT

An information handling system includes a thin panel display device with a camera oriented behind an outer liquid crystal (LCD) layer of the thin panel display device. The outer LCD layer of the thin panel display device having a camera zone through which the aperture of the camera receives light and a processor or set of processors determines camera usage a software application operating on the information handling system and coordinating camera operation and thin panel display device operation through the outer LCD layer in accordance with the camera usage by modifying a display refresh rate at the outer LCD layer camera zone.

20 Claims, 8 Drawing Sheets

(56) References Cited

U.S. PATENT DOCUMENTS

| | | |
|---|---|---|
| 2013/0257768 A1 | 10/2013 | Lee et al. |
| 2014/0098274 A1* | 4/2014 | Asakura et al. ......... 348/333.05 |
| 2014/0098284 A1* | 4/2014 | Oberpriller et al. .......... 348/349 |
| 2014/0104368 A1* | 4/2014 | Tan ............................ 348/14.07 |

* cited by examiner

SYSTEM AND METHOD FOR COORDINATING IMAGE CAPTURE IN A CAMERA HIDDEN BEHIND A DISPLAY DEVICE

FIELD OF THE DISCLOSURE

This disclosure generally relates to coordination of display device function and camera operation, and more particularly relates to coordinating camera operation for a camera hidden behind an outer display field layer of a display device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have one or more display screens for output of images and for input such as by touch screen operation. It is desirable to utilize a display screen with minimum bezel around the edge of the display screen or screens. This may impact location of other devices that are beneficial to locate proximate to the display screen such as a camera used to capture images for the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
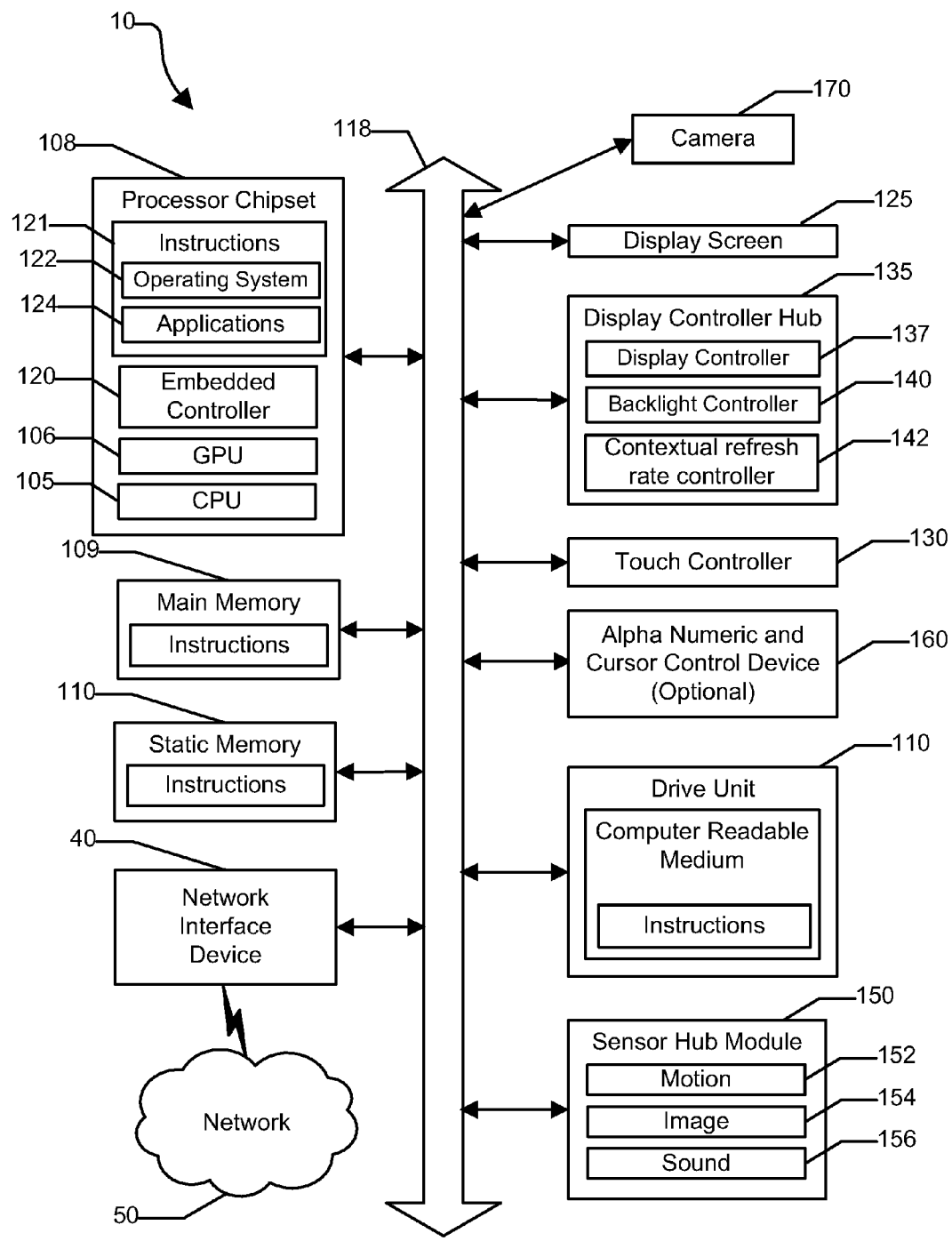
FIG. 1 is a hardware block diagram illustrating an information handling system having an thin panel display device and camera according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Size and efficiency of display devices is desirable as display device interfaces become increasingly important to operating information handling systems. Additionally, traditional information handling system input devices such as keyboards and mouse systems are giving way to visual input interfaces such as touchscreens, hover detection, and motion sensing technologies. In many instances, it is substantially beneficial to implement a system to maximize display device size within a minimized information handling system. This is especially true as thin film display devices, such as various types of LCD and OLED/AMOLED devices, continue to develop with thin, efficient size and profiles. Additional thin film display device technologies may include other types of thin film display technologies. This optimal utilization of a display screen devices is desirable to facilitate usage of the information handling system and additional devices intended to face a user.

One additional information handling system element regularly located in proximity to a display device includes a camera system. Use of such a device in proximity to a display device may be similar to a webcam for teleconferencing or other purposes. Orientation of a camera like a webcam has, in the past, been located in the bezel of the display screen. As thin film display devices have display fields that occupy greater amounts of the user-facing surfaces of the information handling systems, the bezels begin to disappear. As a result, location of a camera proximate to the thin film display device becomes challenging.

The current disclosed embodiments describe a system and method for locating a camera behind an outer display field layer of a thin film display device. Embodiments of the current disclosure also provide methods and systems for coordinating displaying images via the display device and taking images via the camera through the display field layer of the thin film display device. Coordination of the camera and display device may also depend partially on the type of camera usage anticipated from the programs running on the processors of the information handling system. Camera usage parameters are detected by certain system and method embodiments disclosed that may impact how to coordinate camera usage through the outer display field layer of the display device. The disclosed embodiments of the system and method will make modifications to the display by the display device to accommodate the anticipated camera usage.

FIG. 1 shows an information handling system 10 including conventional information handling systems components of a type typically found in client/server computing environments. The FIG. 1 block diagram shows the information handling system 10 with thin film display device 125 capable of administering each of the specific embodiments of the present disclosure. The information handling system 10 can include a set of instructions that can be executed to cause the computer system to perform any one or more of the methods or computer based functions disclosed herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. In a particular embodiment, system 10 can be implemented using electronic devices that provide voice, video or data communication. In a networked deployment, dual display information handling system 10 may operate in the capacity of a server or as a client user computer in a server-client user network environment, or as a peer computer system in a peer-to-peer (or distributed) network environment. Further, while a single information handling system 10 is illustrated, the term "system" shall also be taken to include any collection of systems or sub-systems that individually or jointly execute a set, or multiple sets, of instructions to perform one or more computer functions.

The information handling system may include memory, one or more processing resources such as a central processing unit (CPU) 105 or hardware or software control logic, and operates to execute code. Additional components of the information handling system may include one or more storage devices 109, 110 that can store code, one or more communications ports for communicating with external devices as well as various input and output (I/O) devices, such as a keyboard, a touchpad, a mouse, a video display 125, touchscreen 130, and a camera 170. The information handling system may also include one or more buses 118 operable to transmit communications between the various hardware components.

The information handling system may include memory, one or more processing resources such as a central processing unit (CPU) 105, a graphics processing unit (GPU) that may or may not be integrated with a CPU, and related chipset(s) 108 or hardware or software control logic. System 10 may include several sets of instructions to be run by CPU 105, GPU 106, and any embedded controllers 120 on system 10. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 10. These software applications 124 may enable multiple uses of the information handling system as set forth in more detail below. Applications 124 may include applications involving use of the display device 125 as well as peripheral systems such as a camera 170 as described further herein. Application 124 may further include systems and methods for coordinating the display of images via the thin panel display and operating the camera 170 through the thin panel display as described in more detail herein.

Additional components of system 10 may include main memory 109, one or more storage devices such as static memory or disk drives 110. System 10 may further include an optional external input device 160 such as a keyboard, touchpad, or a cursor control device such as a mouse. System 10 can also include a signal generation device or receiving device, such sound sensors 156, remote control, and a network interface device 40. The information handling system may also include one or more buses 118 operable to transmit communications between the various hardware components.

System 10 may operate as a standalone device or may be connected such as by using a network, to other computer systems or peripheral devices. System 10 can represent a server device whose resources can be shared by multiple client devices, or it can represent an individual client device, such as an individual mobile personal computing system. More specifically, system 10 represents a mobile user/client device, such as a mobile tablet computer or laptop. System 10 has a network interface device 40, such as for a wireless cellular or mobile networks (CDMA, TDMA, etc.), WIFI, WLAN, LAN, or similar network connection, enabling a user to communicate via a wired or wireless communications network 50, such as the Internet. System 10 may be configured with conventional web browser software. The web browser may include for example Microsoft Corporation's Internet Explorer web browser software, Firefox or similar such browsers to allow the user to interact with websites via the wireless communications network 50.

System 10 also includes one or more display devices 125 that may utilize LCD, OLED, or other thin film technologies. Each display device 125 may be capable of touch input via touch controller 130. Each display device 125 has a display controller hub 135. The display controller hub 135 may include control logic and software or access separate control logic and software. Components may include a display controller or driver 137, a backlight controller 140 for LCD thin film display technologies, and a contextual refresh rate controller 142. The one or more parts of the display controller hub 135 may be operated by or integrated with one or more graphics processing units (GPUs) 106 such as those that are part of the chipset 108.

The display device 125 and one or more parts of the display controller hub 135 may also be controlled by the embedded controller 120 of chipset 108. Each GPU 106 and display controller/driver 137 is responsible for rendering graphics such as software application windows and virtual tools on the display device 125. A portion of the display device outer display field layers may be shared by a camera 170 integrated into the display device. This portion of the display device outer display field layer may be referred to as the camera zone. The camera zone is an area of pixels behind which the integrated camera 170 is located. It may be of a variety of sizes to best accommodate the operation of the integrated camera 170 oriented behind the outer display field layers. It is further understood that the outer field display layer may include multiple layers capable of transmitting images. Those layers will depend on the thin film display technology used as described further below. Generally it will include a thin film transistor or active matrix transistor for control of pixel cells including on/off control, a color filter or color light transmitting component depending on technology, and structural and light conditioning layers that vary with thin film technology.

The entire outer display field layer, some portion such as a select number of columns or rows of pixels of the outer display field layer, or just the camera zone with the integrated camera 170 behind it may be controlled via the display controller 137, backlight controller 140 if an LCD, and a contextual refresh rate controller 142 to coordinate image display with camera 170 usage. The rasterizing frequency or refresh rate of image display on the thin film display device may be modified to accommodate image taking by the camera 170 oriented behind the outer display field layer. Alterations to rasterizing or refresh rate, to backlighting in LCD applications, and to opening the outer display field layer to receive light may be localized to the camera zone, some portion of the outer display field layer, or the entire outer display field layer.

As described further below, the camera aperture receives light and images through the outer display field layer(s) of the thin film device. The location of the camera behind the outer display field layer(s) is referred to as a camera zone. During image taking by the camera 170, some or all of the outer display field layer camera zone is modified to enhance light for images to be received by the camera 170 oriented behind it. A lens region of the camera zone permits image taking through the outer field display layer(s). Reduction of interference with image taking such as reducing backlighting or reducing rasterizing through the camera zone portion of the outer display field layers can improve image capture by the integrated camera system 170. Image taking or image capture can refer to any type of camera operation whether still image capture, video, or other functions. In at least several embodiments, image capture may be done without substantial degradation to the displayed image on the thin film display device 125. In other embodiments, the camera zone may be made transparent during camera image capture functions.

The location and positioning of the camera zone may be established along an edge of the thin film display device 125 in one embodiment to avoid the coordination of the camera function from impacting a central portion of the thin panel display device 125 image display. An edge location of the camera 170 oriented behind the outer display field layers of the display device 125 permits easier mounting for the camera 170. Further, location of light sources for backlit thin film display technologies may be located to avoid interference with the camera 170 at the edge. Then control over brightness of light guide elements for backlighting to any camera zone associated with the camera is utilized. AMO-LED/OLED technologies do not incorporate backlighting, but instead brightness is controlled by active control of light generation from organic material in the pixel cells. In an example embodiment, an algorithm reduces the volume of cells turned on by a TFT matrix. With either technology, edge location may avoid interference with central portions of the thin film display device and make camera mounting simpler.

At the edge, the camera 170 may be oriented toward a likely user location. The user location may be central and in front of the display device 125. In some embodiments, this enables a zero-bezel thin film display device or near zero bezel display device to have a proximate, integrated camera for image capture such as video teleconferencing and other purposes. Example image capture uses include still frame capture, video capture, or facial recognition or gaze recognition applications. While an edge location is described in several embodiments herein, the camera 170 and camera zone may be located behind any location of the outer display field layers of the thin film display 125 depending on the desired information handling system design and camera purpose.

In several embodiments described herein, the location of the camera zone may be identified by displaying an image indicating the camera zone on the thin panel display. This will facilitate camera usage when the camera 170 is hidden behind the outer display field layer(s) of the thin panel display device. Additionally, the operation of the camera 170 may require or request that a user look at the camera or the camera zone. It is contemplated that a window, tile, thumbnail, icon and other camera zone indicator image may be displayed at the camera zone to identify the location of the camera 170 behind the thin panel display device 125. Moreover, the camera zone indicator image may be selectable, such as via a touch on a touch screen, before the camera zone is activated and the camera 170 may operate. This may provide a measure of privacy for the user. The camera zone indicator image may also be selectable to yield access to a menu for camera settings or other settings related to use of the camera with the application. Additionally, the camera zone indicator image may remain at or around the camera zone while a lens region of the camera zone may be modified to coordinate camera operation. The lens region in one embodiment may only be part of the camera zone. In another embodiment the camera zone indicator image may be at a different location from the lens region and camera zone, but may assist in indicating where the camera zone is located.

In one embodiment, the camera and thin panel display device coordinating system may detect the application or applications to be run on the information handling system to determine what type of camera usage is likely to be encountered in connection with camera coordination. Such a system may operate on the CPU 105 or GPU 106 via the chipset 108 based on the software applications 124 currently running and active and their status. Alternatively, determining which applications 124 are running may also be determined by an embedded controller 120 or the contextual refresh rate controller 142 separate from the main chipset(s) 108.

System 10 of the current embodiment also has a system sensor module 150. Various orientation sensors are included in this module to assist with determining the relative orientation of the information handling system. Subcategories of orientation sensors include motion sensors 152, image sensors 154, and sound sensors 156. Sensor system module 150 is a sensor hub, or an accumulator device, that collects raw data from connected orientation sensors, and organizes and processes data received from the connected sensors. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection. Sensor data may impact determination of what software applications 124 are actively being used on the information handling system.

Figure 2:
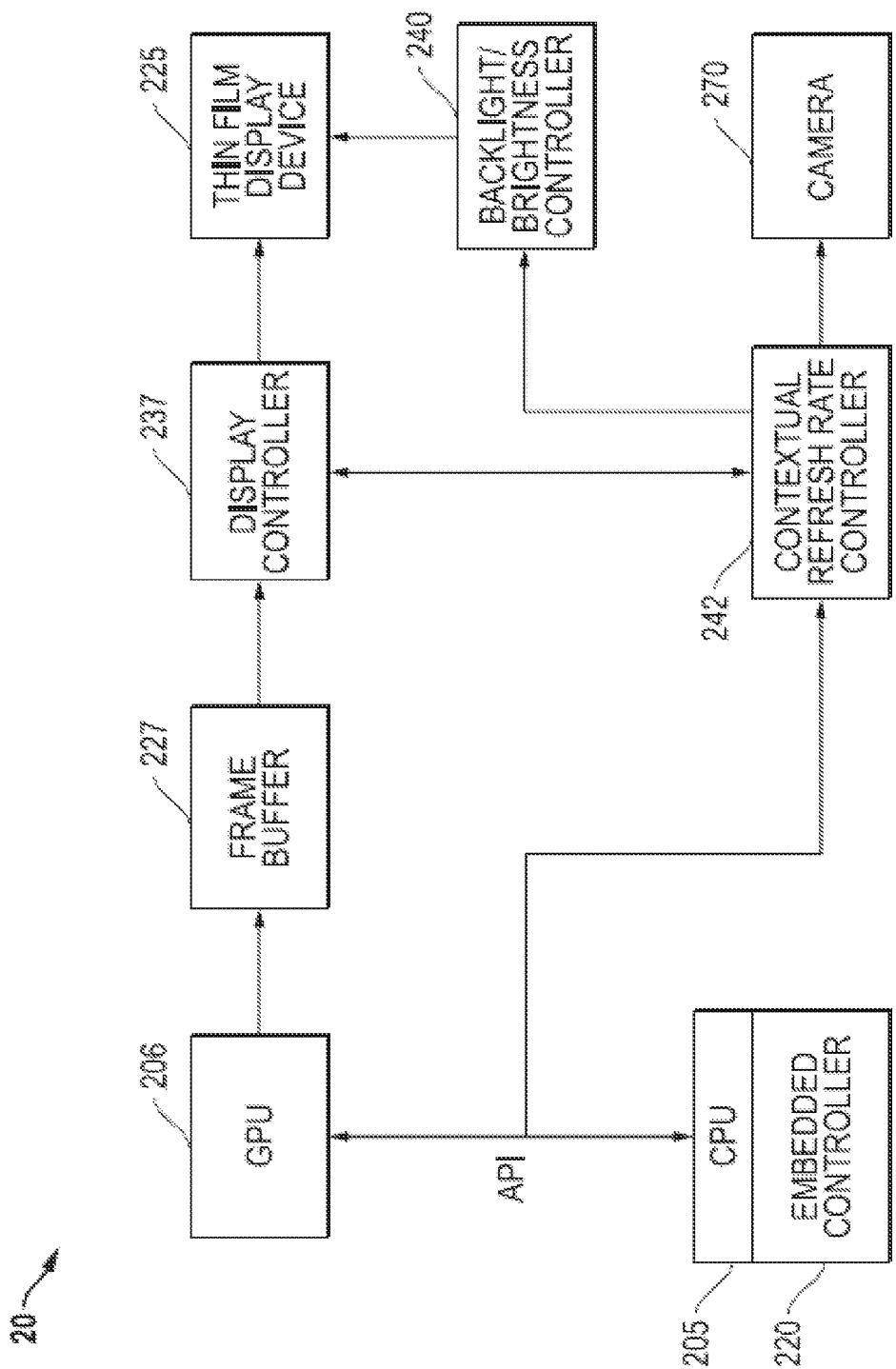
FIG. 2 illustrates a block diagram illustrating the hardware devices involved in coordinating thin panel display device and camera operation according to an embodiment of the present disclosure.

FIG. 2 illustrates a system block diagram of a system 20 including hardware, firmware, and software elements for controlling a thin film display device 225. System 20 executes code in software and firmware for coordinating thin film display device 225 operation with operation of camera 270 oriented behind the outer display field layer of thin film display device 225. The system 20 is a subset of the information handling system 10 shown in FIG. 1.

Coordination of the thin film display device 225 and camera 270 involves control of the displayed images on the thin film display device 225. Coordination occurs via instructions running on or between elements of the processor chipset or an external controller such as an MCU associated with the display device 225. This may include GPU 206, CPU 205, and embedded controller 220 executing all or parts of instructions for coordinating display of images and modification of display device parameters depending on actual or expected context of camera usage. The GPU 206, CPU 205 and embedded controller 220 may coordinate via the information handling systems application programming interface (API). The API coordinates the various elements of code run on one or more processors in the chipset or controllers associated with the display and its drivers. These code elements may comprise the systems or perform the methods described herein to anticipate camera usage and initiate modifications to the thin film display device 225 to facilitate camera usage. The various portions of code that comprise the disclosed methods and systems include several features. The camera coordination system may execute code to determine the camera usage parameters for active and expected camera use and to modify refresh rate, backlighting and any camera function by the contextual refresh rate controller. This may include code to perform one or more of the following including the detection of the context of the information handling system including software applications to be run on the information handling system, determination of anticipated camera usage, accessing corresponding camera refresh rates corresponding to expected image capture functions, allocation or identification of camera zone location, display of a camera zone indicator image, control of modifications to display refresh rates, control of modifications to brightness, and camera and display device function.

The GPU 206 performs various typical operations in preparing images for display. This includes scaling, drawing, rendering, texture engines, and pixel engines. Upon rendering frames, they are transferred to a frame buffer 227 for display at a given raster rate or refresh rate on the display device 225. Display controller 237 includes, among other elements, a row driver and column driver for pixel elements in the thin film display. Row and column drivers may drive thin film transistor (TFT) control of pixels when rendering frames of images. Backlight or brightness controller 240 depends on the technology deployed as a thin film display device 225. LCD technology may require back lighting to display images. OLED/AMOLED technology utilizes voltages applied across organic light emitting materials that function as light emitting diodes within pixel elements. Brightness is controlled by varying voltage applied across subsets of pixels to dim an image in OLED/AMOLED technology.

The contextual refresh rate controller 242 may be a software module, firmware, or ASIC logic to apply modifications to the refresh rate of the display controller 237 or backlight/brightness controller 240. The contextual refresh rate controller 242 may apply these modifications to all or part of the thin film display device 225. In one embodiment, the part of the thin film display device 225 may be a camera zone or a limited number of rows or columns that comprises or includes the camera zone of the thin film display device. The context refresh rate controller 242 may similarly control image capture refresh rates of the camera 270 to ensure the image capture is asynchronous with modified display refresh rates of the thin film display device. In a particular embodiment, the display refresh rates may be reduced such that the camera zone of the thin film display device 225 has nearly imperceptible degradation of displayed image quality while enhancing the quality of the image capture capabilities of the camera oriented behind the outer display field layer.

Figure 3:
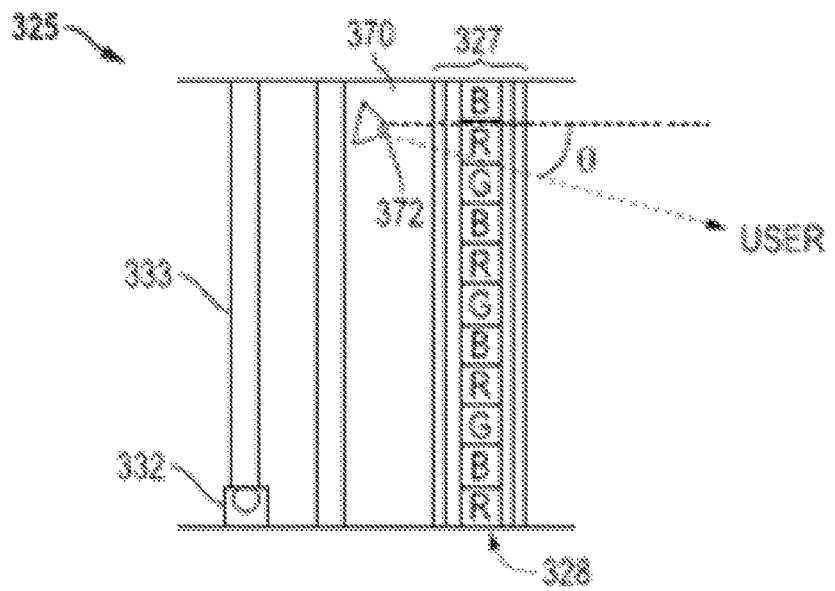
FIG. 3 illustrates an example thin panel display device and camera according to an embodiment of the present disclosure.

FIG. 3 shows an example of a thin panel display device 325, or a portion thereof, with camera 370 oriented behind the outer display field layer or layers 327 of the thin panel display device 325. FIG. 3 is not drawn to scale. For example, the size of the camera, the pixels and relative thicknesses of layers and spacing is not to scale. Additionally, the location of the user may be different due to the scale of the portion of the display device shown. Additionally, one of skill in the art would understand that the scheme of color arrangement for pixels 328 may not be in linear cross-section as shown and may be in any order.

In the example embodiment, the camera 370 is oriented behind a display field of the outer layers 327 of the display device 325. In other words, the light received at camera aperture 372 is received through the outer display field layers 327 that also display images on the thin panel display device 325. In one embodiment, the camera is located along an outer edge of the outer display field layer 327. In the shown embodiment, the camera is located near the top edge of the outer display field layer 327. In yet another embodiment of the present invention, the thin panel display device 325 is a zero bezel or near zero bezel device such that all, or nearly all, of the front surface of the thin panel display device 325 displays images with no bezel or frame around the sides.

In an example embodiment, the outer display field layer 327 may be made thinner at the camera zone in front of camera 370 and camera aperture 372. In this embodiment, the outer display field is thinned to make the camera zone in front of camera 370 more semi-transparent. This may be done while minimizing change to quality of the displayed images in another embodiment. Thinning any portion of the thin panel display device 325 is contemplated as well to enhance transparency, not necessarily just a designated camera zone as described below. Thinning of edges along any or all edges of the thin panel display device may be contemplated for example. In one example embodiment, an LCD display has a thinner semi-transparent zone along the bezel. This can be achieved by reducing liquid crystal thickness and density around the edge to provide better camera access to images. A similar embodiment is contemplated for other thin film display technologies such as OLED/AMOLED.

The outer display field layer or layers 327, hereinafter outer display field layers 327, may include several component layers of the thin panel display device 325 or may be viewed as a single layer. What comprises these layers depends on the technology used for the thin panel display device. A color filter layer 328 will be included in an LCD or other thin panel display device 325. The color filter layer may be replaced with the light source for different colors 328 in organic light emitting diode material pixels in OLED/AMOLED devices.

Thin panel display device 325 may also include additional layers depending on the type of technology deployed for the thin panel display. In the case of LCD panels, a backlight 332 and light guide layer 333 may provide light through the LCD layers for display of images. The back lighting may need conditioning before being travelling through the liquid crystal and color filter layers. These layers may include prism layers, diffusers, and polarizer layers before reaching the TFT and liquid crystal pixel layers. These backlighting, prism, diffuser and polarizer layers may not be necessary for OLED/AMOLED thin panel display devices. OLED and AMOLED devices generate light via organic LED materials in each pixel color component upon application of TFT voltage.

In one embodiment of the present disclosure, camera 370 oriented behind the outer field display layers 327 may be angled by an angle θ such that the aperture 327 of camera 370 is generally aimed toward a central location in front of the thin panel display device 325 where the user is expected to be. Polarization of light by the thin film display panel technology used may require modifications to permit coordination of the thin panel display device 325 operation and the operation of the camera 370. For example, in an LCD embodiment, polarization of light through twisted nematic liquid crystal and polarizing layers may require adjustment at the camera zone to permit light to be received from locations center-front before the display device 325 at an appropriate angle θ to the camera aperture 372.

Figure 4:
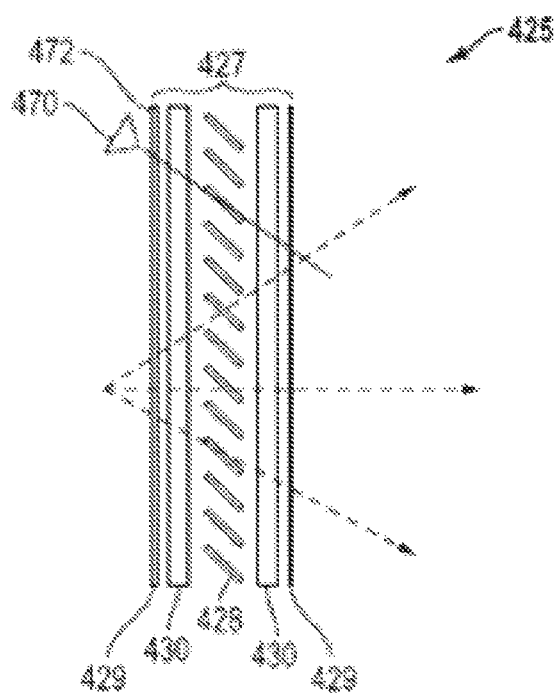
FIG. 4 illustrates an another example thin panel display with an outer display field layer and camera according to an embodiment of the present disclosure.

FIG. 4 shows another thin panel display device 425 with camera 470 oriented behind the outer display field layer or layers 427 of the thin panel display device 425. FIG. 4 is similarly not drawn to scale. Polarizer layers 429 and glass layers 430 sandwich liquid crystal LC layer 428. As can be seen in the example embodiment, the liquid crystals of LC layer 428 may be adjusted to open so that they line up with the angle of orientation of aperture 472 of camera 470. The amount of twist in the LC layer 428 may be controlled by voltage such that the LC molecules open up at an angle as shown when a certain voltage is applied (or voltage removed depending on LCD setup). In the shown embodiment, the LC layer is opened or aligned with a voltage level in accordance with the aperture angle of camera 470. This angle may be set at θ to an anticipated center-front location before the thin panel display device 425 where the user is expected to be.

Figure 5:
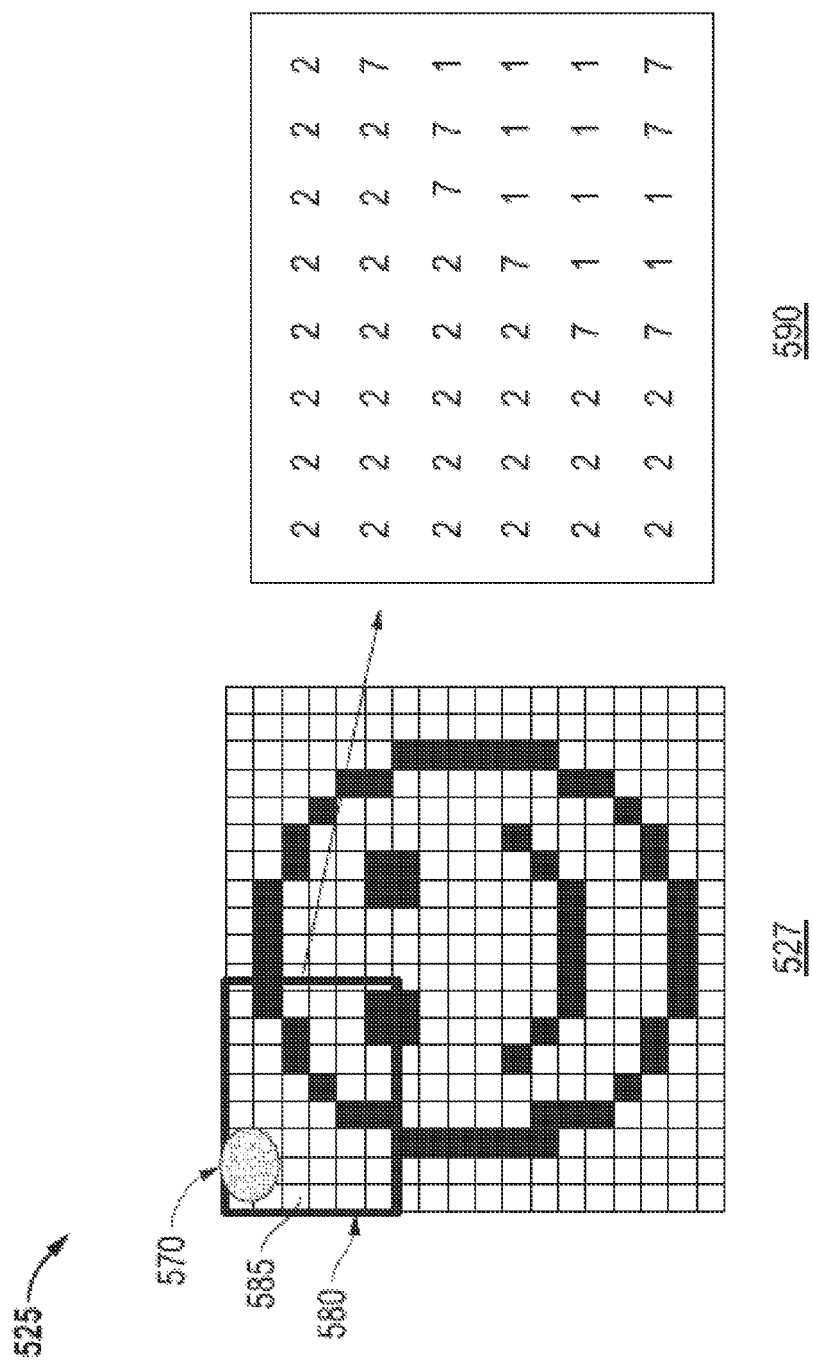
FIG. 5 illustrates another example thin panel display device with a camera zone according to an embodiment of the present disclosure.

FIG. 5 shows another view thin panel display device 525 with camera 570 oriented behind the outer display field layer or layers of the thin panel display device 525. FIG. 5 shows a front view of the outer display field layers 527 on the right. Camera zone 580 may include a zone of pixels 585 that is approximately sized in pixel area to accommodate any light passing through the outer display field layers 527 to the camera 570. The size of camera zone 580 may be substantially small relative to as few pixels as needed to allow light to pass to the camera 570 or may be substantially larger to ensure fuller view by the camera 570. Size of the camera zone 580 may depend on the capabilities of the camera 570 oriented behind the outer display field layer 527. Example pixel values 590 are shown on the left for the image in the outer display field layer 527. These include example pixel values for the camera zone 580. Again, one of ordinary skill will understand that this figure is not drawn to scale but meant to show a simplified pixel layout for a thin panel display device 525. In this embodiment, the camera is located in the upper left corner behind the outer display field layer 527. The camera zone 580 may be located at any pixel area of the outer display field layers 527 of the thin panel display device 525 in accordance with the location of the camera 570. In one embodiment, the thin panel display device 525 is a zero bezel or near zero bezel device such that it is advantageous to have a proximate camera 570 oriented behind the outer display field layers 527 facing a user in front of the display device surface. In another embodiment, the camera 570 and camera zone are placed along an outer edge of the outer display field layers 527 to minimize impact of the disclosed system and methods on the central portions more likely to be viewed of the outer display field layers 525. Other camera 570 locations and camera zone 580 locations are contemplated as is an embodiment where the entire front surface of the thin panel display device 525 outer display field layers 527 are modified in accordance with coordinating camera operation.

Figure 6:
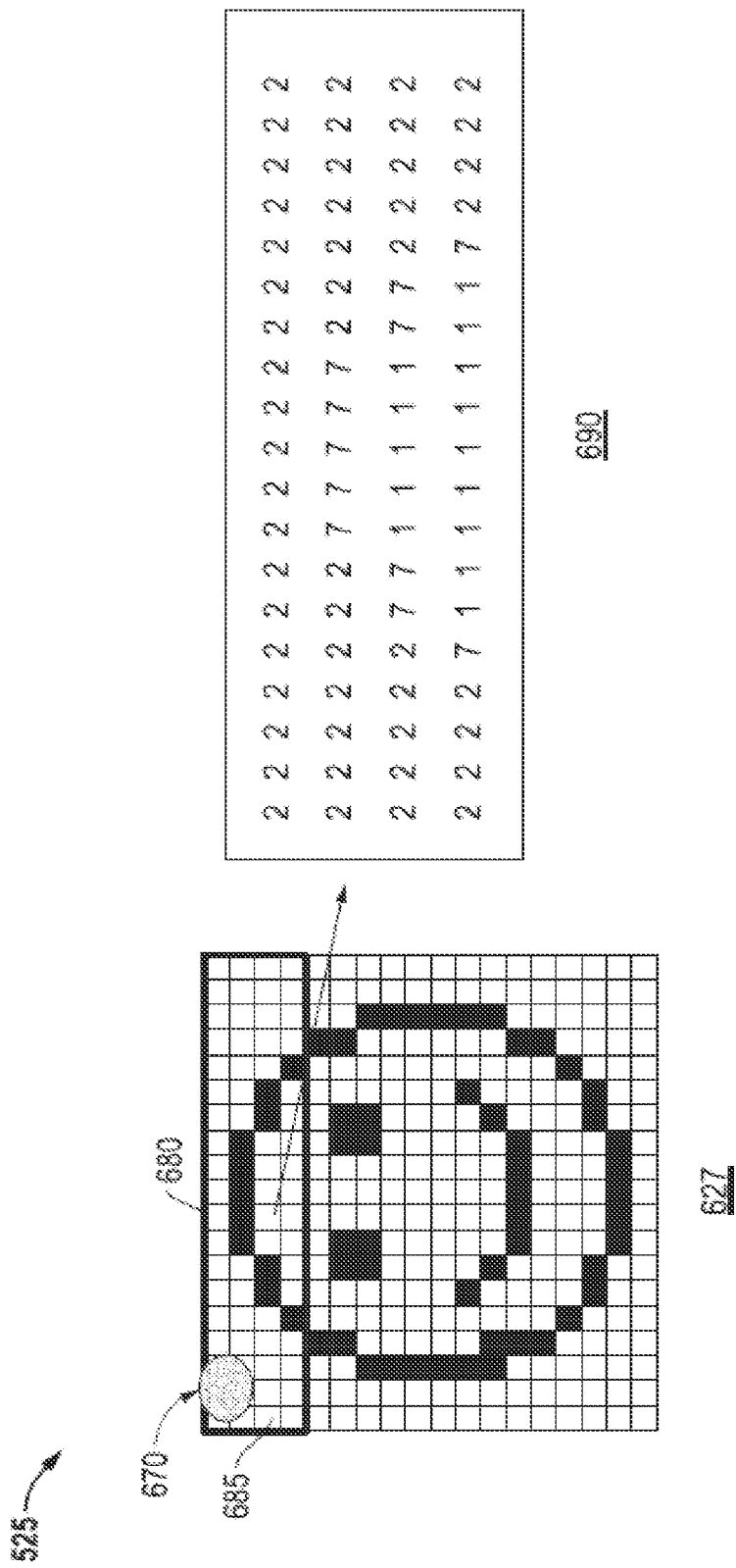
FIG. 6 illustrates another example thin panel display device with a camera zone according to an embodiment of the present disclosure.

In another embodiment shown in FIG. 6, the thin panel display device 625 with camera 670 oriented behind the outer display field layer or layers of the thin panel display device 625 is also shown from a front view. This is another embodiment showing camera zone 680 as a range of rows of pixels 685 that is approximately sized in pixel area in at least one dimension to accommodate any light passing through the outer display field layers 627 to the camera 670. Selection of a range of rows, or alternatively a range of columns (not shown), may simplify control of the modification of the display panel camera zone area during camera coordination. For example, the row drivers may be controlled for entire rows of the camera zone 680 as shown. To designate the entire row simplifies control since the row drivers may be modified with respect to modified display aspects, such as row refresh rates, as compared to the embodiment shown in FIG. 5 requiring coordination of partial rows and columns.

Similarly, depending on the thin panel display technology used, backlighting for LCD or brightness control for OLED/AMOLED may be simpler to control. OLED/AMOLED brightness control, for example, may involve commands to control entire rows of OLED/AMOLED pixels simplifying brightness control algorithms as compared to the embodiment of FIG. 5. For LCD technology, backlighting may be controlled for certain zones via control over select light guide transmissions to that zone. Several embodiments as to the size of camera zone 680 are contemplated such that camera zone 680 may be substantially small relative to a as few pixels as needed to allow light to pass to the camera 670 or substantially larger camera zone 680 to ensure fuller view by the camera 670. Example pixel values 690 are shown on the left for the image in the outer display field layer 627. Again, one of ordinary skill will understand that this figure is not drawn to scale but meant to show a simplified pixel layout for a thin panel display device 625. In this embodiment, the camera is located in the upper left corner behind the outer display field layer 627. Variations to camera 670 location and camera zone 680 location are contemplated as described with respect to embodiments above for FIG. 5. Similarly, an embodiment is contemplated where the entire outer display field layers 627 are modified in accordance to the system and methods disclosures for coordination of camera operation described herein.

Figure 7:
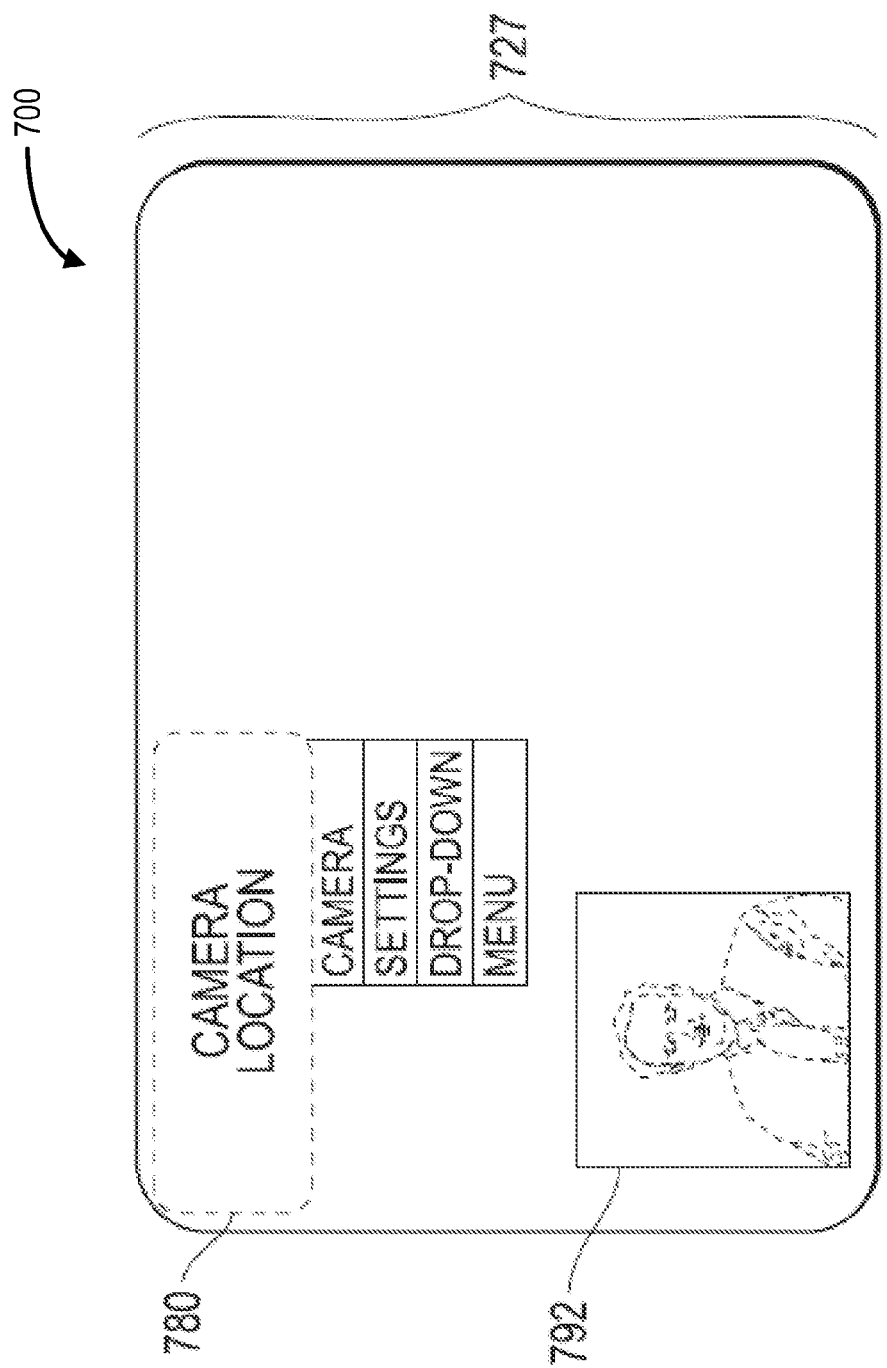
FIG. 7 illustrates another example thin panel display device with a camera zone and displayed image indicating the camera zone according to an embodiment of the present disclosure.

In yet another embodiment shown in FIG. 7, the thin panel display device 725 with camera oriented behind the outer display field layers 727 of the thin panel display device 725 is also shown from a front view. This is another embodiment showing camera zone 780 on thin panel display device 725. Camera zone 780 is designated by a camera zone indicator image 782 displayed on the thin panel display device over all or part of the camera zone 780. In the depicted embodiment of FIG. 7, the camera zone indicator image 782 is of similar size to the camera zone 780. In one embodiment, the camera zone indicator image 782 is selectable. Camera zone indicator image 782 may be selectable to activate operation of the camera at the camera zone such as by touch or click in one embodiment. In that embodiment, the camera and camera zone 780 may remain inactive until activated by touch to provide a measure of privacy assurance for the user.

In another embodiment, the camera zone indicator image 782 may be selectable, for example by touch, to generate a drop-down menu 784 for a user to access camera settings. Selection of the camera zone indicator image 782 may be selected by touching the camera zone indicator image 782 on a touch sensitive thin panel display device. Camera settings may include flash/no flash capability, image data capture levels, application of image conditioning such as high dynamic range imaging, image orientation, exposure levels, and so forth as is known by persons of ordinary skill. Other images for display 792 are shown in FIG. 7 as well. Image 792, for example, depicts an embodiment for a teleconference application showing the image of a person or persons at the other end of a video teleconference call. Applications, such as document sharing software or other applications may be running and displayed in other portions of the thin panel display device 725 as well (not shown).

The camera flash may be provided in an embodiment via the brightness level of the display device. In an LCD embodiment, the backlighting may be manipulated according to the system and methods disclosed herein to provide a flash through the camera zone 780 or from another display device screen location. The flash mode operation assists image taking by providing light through the camera zone 780 for a video, still image, or other application in one example embodiment. An area elsewhere on the outer display field layers 727 of the thin film display device 725 provides flash or additional light during camera operation in an alternate embodiment. For example, a distinct flash or illumination area from the camera zone 780 of the outer display field layers 727 is beneficial for OLED/AMOLED and similar technologies. This is due to OLED/AMOLED pixel elements providing their own light source that could over-expose the camera oriented behind the outer display field layers of these devices during a flash.

White light or other lighting color options are available for ambient light. In one embodiment, a flash zone nearby or adjacent to the camera zone 780 may provide additional light for illumination during camera operation such as via a flash effect or additional ambient lighting from the display device. In a further example embodiment, a flash icon indicator image may appear where the flash zone will occur. In one example embodiment, the flash may be generated by a pixel zone adjacent to or nearby to the camera zone. This may be a frame or area around all or part of the camera zone 780. Thus, the flash for the camera application may be integrated and take advantage of the illumination provided already by the thin panel display device 725. Flash may also be automatically initiated if the camera system detects that the image taking is likely to be too dark through the camera zone 780. In yet another embodiment, flash at the camera zone 780 or at a flash zone may also be supplemented or replaced by an additional flash system oriented behind the outer display field layers 727. Coordination of the flash through a flash zone or camera zone 780 may be conducted in accordance with the system and methods disclosed herein to coordinate camera operation and thin panel display device operation.

Figure 8:
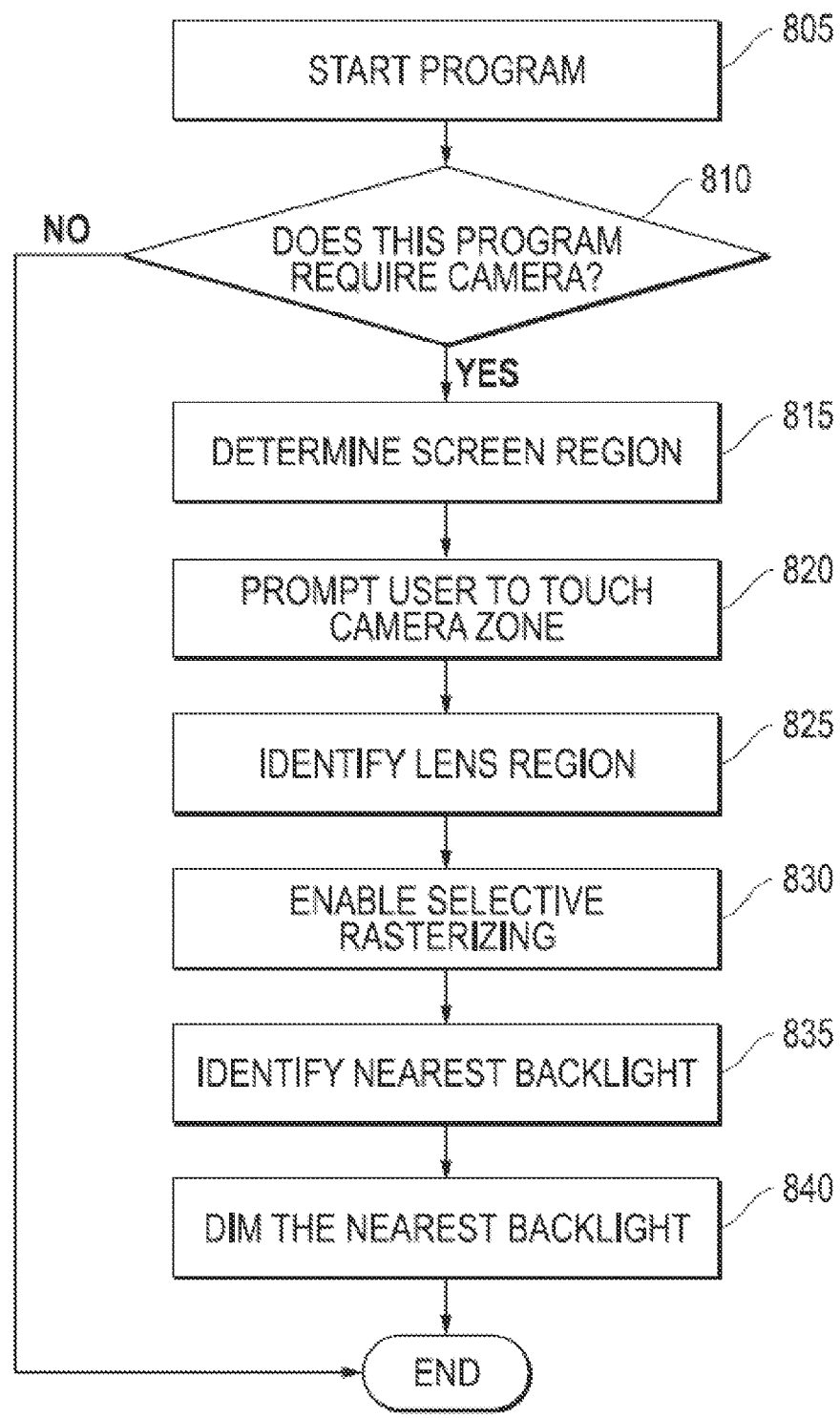
FIG. 8 is a flow diagram illustrating an example method for coordinating display by a thin panel display device with image taking by a camera according to an embodiment of the present disclosure.

FIG. 8 shows a flow diagram illustrating a system and method for coordinating camera operation and a thin panel display device displaying images through at least a portion of the same outer display field layers. The system and method for coordinating camera operation with the thin film display operation determine the information handling system context by determining the applications running and anticipated camera usage on those devices.

The process begins at 805 where the information handling system has an application program started on the system. Proceeding to decision diamond 810, a processor executing instructions determines the contextual environment operating on the information handling system. The contextual environment includes whether an application program or programs require camera usage. If no camera usage is required, then the method ends. If camera usage is required, the flow proceeds to 815. In an additional embodiment the system and method determine possible types of usage of the camera device. Examples of anticipated or current camera usage by an application program may include capturing still images, periodic image taking, various levels of video image capture, proximity and location detection via camera, or image or motion recognition camera uses. For example, the levels of required image quality of an application may vary. Taking a video may vary widely in required quality. For example, it may be desirable for some applications taking video to be very high quality for later playback purposes. Other applications may compromise somewhat on the amount of image data captured for each frame of video. One example may include certain types of real-time video teleconferencing that must compress and transmit the video in real time or near real time anyway. Lower level video data levels may be desirable when using such real time or near real time connections.

In another contextual example, a camera may be used for tracking gaze of a user for interaction with an application. The camera may be used with gaze detection to determine parts of a display device or devices actively being viewed by a user. Gaze control can be used to determine thing such as which application window is being actively used from among multiple application windows. Gaze control may be used as well to execute commands within applications. For example, gaze can control scrolling or page turning in an application. Eye tracking and gaze technology implementations are available in the art from companies such as Synaptics, Inc. and Tobaii Technologies. Description of this technology is found at http://www.synaptics.com/about/press/press-releases/tobii-and-synaptics-unveil-concept-laptop-integrates-eye-tracking-and-touch (press release Jun. 25, 2013) and incorporated herein by reference. Such an application may either continuously or periodically monitor images of a user's gaze. Similarly, the camera may be used for image recognition purposes such as for security access to applications or for other purposes. Required image quality levels and camera operation during image capture may vary for the above described examples. Determining camera functional aspects such as still versus video, pixel quality levels, amounts of video data collected, exposure levels to the image, et cetera are relevant to the varying camera usage parameters for the camera in the context of applications running on the information handling system.

Proceeding to 815, the processor determines the thin panel display device screen region where the camera oriented behind the outer display field layers is located. At 820, an image is displayed on the thin panel display device indicating the screen region location for the camera. The user may be prompted to touch the camera screen region to indicate a desire to use the camera or to activate the camera. The method or system then identifies a lens region for the camera that is the pixel area of a camera zone on the outer display field layers through which the camera may operate at 825. The lens region may be all or part of the camera zone depending on the embodiment.

The dimension of pixel area for the camera zone may be selected for several reasons as described above. While a typical camera zone may be a circular display field area of a diameter of only a millimeter or two, square, rectangular, and other camera zones may be desirable. For example, setting selected by the user may provide options for setting the size of the camera zone. These options may be presented to a user via a drop-down menu accessible by touching the screen region image indicating the camera location. Such a drop-down menu may include a plurality of camera settings. Additionally or alternatively, the anticipated operation of the camera and the camera zone area required to capture sufficient light for image taking may impact determination of the camera zone. For example, low light conditions may require a larger camera zone. Also, if a camera usage requires a wide angle image taking, a greater camera zone area may be allocated to allow a larger image to be captured. A narrower display field camera zone may be desirable for image taking when adequate light is available. A smaller display field camera zone area may be sufficient for low quality image taking too.

Also, the camera zone may be impacted by efficiencies in operation of the thin panel display device technology when implementing a modification to the outer display field layer operation to coordinate camera usage and display of images. A camera zone may utilize efficiencies in TFT control of the pixel rasterizing. For example, it may be more efficient to control rasterizing modifications to just rows or columns of pixels in the outer display field layers rather than algorithmic control of a camera zone where rows or columns will operate at differing rasterizing rates during the coordination. Or a camera zone may be impacted by control of brightness at screen regions. For example, screen regions of the outer display field layers may be brightness controllable in a back lit LCD by a discrete number of light guide elements illuminating the screen region. Thus, those light guides may be controlled when modifications are made, without affecting the remaining back lighting of the thin panel display device during coordination of camera function.

At 830, the flow proceeds to enabling selective rasterizing at the camera zone. At this stage, the camera operation coordinating system and method as described herein control the refresh rate of the camera zone area of the outer display field layer. In certain embodiments, the camera coordination system will implement an algorithm of camera zone refresh rate modification to make the camera refresh rate and display refresh rate of the camera zone outer display field layers asynchronous. The camera coordination system determines the anticipated camera usage parameters, the camera refresh rates during the anticipated operation, and potentially ambient conditions. Then the camera coordination system access a database to determine what raster rate modifications are necessary to make displaying images on the outer display field layers of the camera zone asynchronous from the camera image taking activity based on the type of image taking to be done by the camera. Asynchronous refresh rates between camera image capture and display of images by the outer display field layers can permit simultaneous operation of the camera and the display device. In one alternative embodiment, reducing display device refresh rates at the camera zone can improve camera image capture in certain embodiments. Permitting an increased camera refresh rate during image capture can occur with reduced display refresh rate at the camera zone and further improve image capture. In one example embodiment, image continuation algorithms may be used to ensure smooth transitions during the image taking to reduce jitter or hesitations during a video mode or video conference mode. The raster or refresh rate of the display function in the camera zone, and in particular the lens region of the camera zone, is modified in accordance with the anticipated camera usage. As explained above, the anticipated camera usage is detected by determining the context of software applications to be operated on the information handling system.

According to one embodiment, the refresh rate of the pixels of the outer display field layers is reduced to a point such that the image projection is not substantially diminished; however the camera has increased access to capturing light for images through the outer field display layers of the camera zone. In one specific example, if a typical raster display rate for the thin film display is 60 Hz, during camera operation the camera zone pixel area display refresh rate will be reduced to a raster display rate of 20 Hz. At approximately 10 Hz or thereabouts, the display refresh rate of the camera zone will noticeably diminish the quality of the displayed images. In another embodiment, the camera zone pixel area is turned "off" or the raster rate is reduced to zero. In that case, the camera zone becomes transparent and does not display images. Image capture by the camera is the only function through that camera zone during this embodiment. In another variation to that embodiment, the displayed images may be resized to fit the remainder of the thin film display device screen. For example, when the camera zone is a set of rows (or columns), the displayed images on the remaining rows and columns are resized.

The camera may continue to operate at an image capture refresh rate, for example 60 Hz. A microcontroller unit controls the display drivers and the camera system coordinates reducing the display pixel refresh rate asynchronously with the refresh rate of the camera. The coordination helps to ensure that the display field displays images when the camera is not capturing images, and the camera captures images when the outer display field is not displaying images at the camera zone. In other words, the higher image capture refresh rate of the camera helps to reduce jitter or lag in the images captured by maximizing the time that the camera may capture images and gather more image data. Reducing the display refresh rate at the camera zone results in less time that the camera zone area of the outer display field layers are projecting an image and can instead allow light to pass to the camera to capture images. In one example embodiment, the modification of refresh rate can be localized around the camera location. In other embodiments, the refresh rate may be modified for the entire display device or any portion of the display device.

At 835, the camera coordination system and method may control backlighting or brightness during camera operation. Again, the same or a different microcontroller unit may also control backlighting in the camera zone in the case of LCD technology. A processor or microcontroller unit may control brightness at the camera zone in the case of AMOLED/OLED technology. AMOLED/OLED brightness control involves algorithmic reduction of a subset of pixels being illuminated by algorithmically or otherwise reducing voltage application across the subset of pixel AMOLED/OLED cells as is understood in the art. The camera coordination system and method of the present embodiment of FIG. 8 identifies the nearest backlight in an LCD embodiment to the location of the camera. This includes identifying a light source or one or more light guides that supply backlighting to the outer display field layers of the camera zone area. Locating the camera along an outer edge of the thin film display device may have the benefit of locating light sources so as not to interfere with the camera at an outer location. Light sources may be placed at alternate locations to avoid light interference with the camera and backlighting piped in to or reflected to the camera location via light guide or other mechanisms.

At 840, the camera coordination system and method will implement dimming the nearest light source or light guide during operation of the camera. The backlighting may in alternative embodiments be used to increase the ambient light when low light levels are detected by the camera when capturing images. In other alternative embodiments, a flash mechanism may be implemented using the backlighting or an additional light source near the camera to improve camera function through the outer display field layers of the camera zone. In one alternative embodiment, the microcontroller unit or other processor may commence an algorithm to dim or otherwise alter the brightness of an AMOLED/OLED thin film technology. Dimming the AMOLED/OLED brightness may be done to reduce light levels at the camera zone in conjunction with operation of the camera to capture images. Alternatively, increased brightness via the AMOLED/OLED may be desired in low-light conditions to capture images. An alternative light source may also be implemented such as a flash light source that may operate through the same camera zone or a different flash zone of pixels in the outer field display layers. At this point, the process of FIG. 8 ends.

Figure 9:
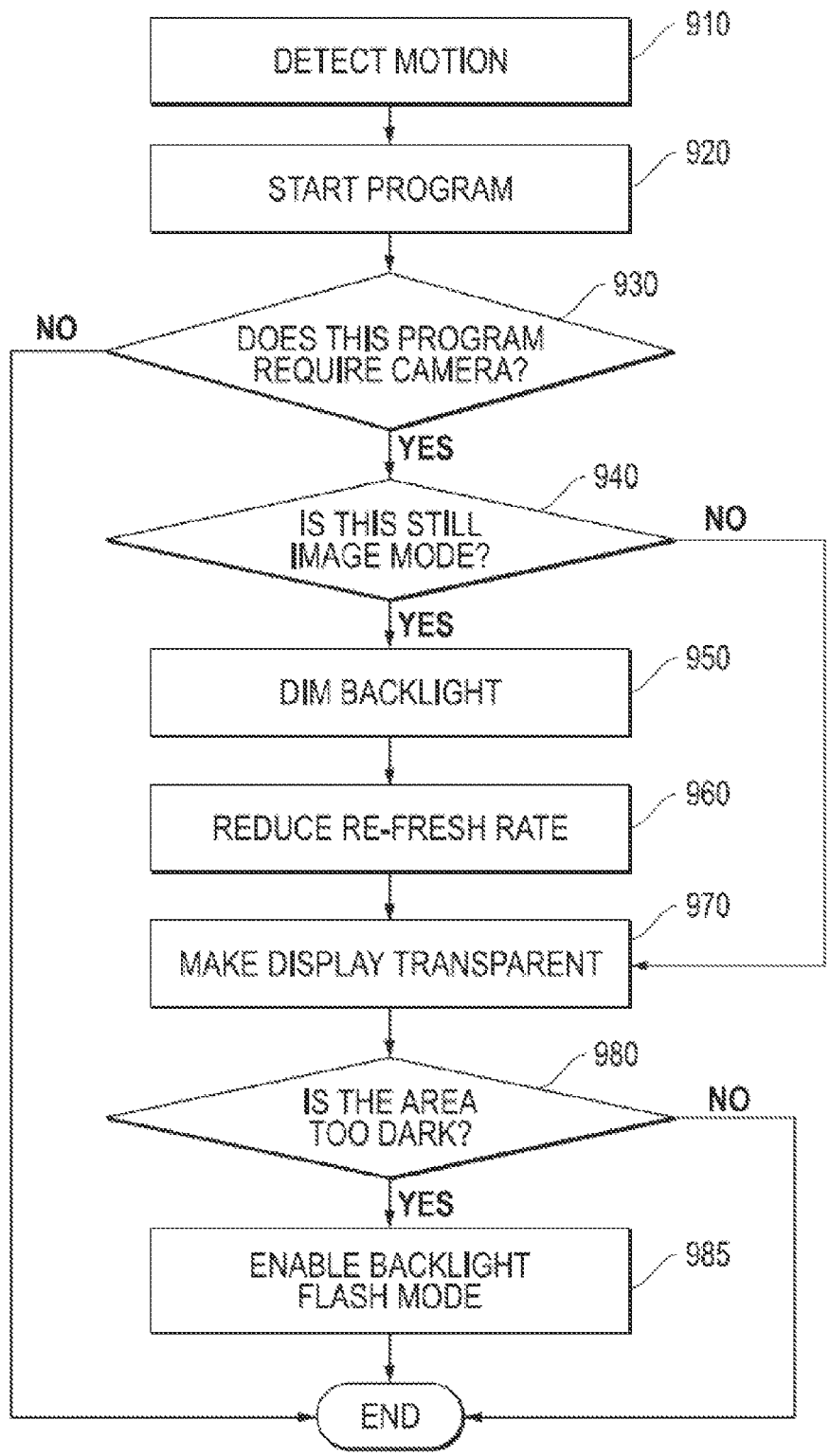
FIG. 9 is a flow diagram illustrating another example method for coordinating display by a thin panel display device with image taking by a camera in video conference mode according to an embodiment of the present disclosure.

FIG. 9 shows a flow diagram illustrating a system and method for coordinating camera operation and a thin panel display device displaying images through at least a portion of the same outer display field layers. The system and method for coordinating camera operation with displaying images on the thin film display determines the information handling system context by determining the applications running and anticipated camera usage on those devices. Then the camera coordination system modifies the display characteristics and brightness levels at a camera zone of the outer display field layers of the thin panel display according to the anticipated camera operation requirements.

The process begins at 910 where the information handling system may detect motion. A sensor hub module may detect motion of the information handling system such as from a gyro, accelerometer, or other digital motion sensing system. It is understood that the motion detection data is fed back to the sensor hub for translation of the motion to reach a particular threshold of acceleration, velocity, or orientation. A processor or controller may commence a set of instructions or an application based on reaching a certain threshold or orientation. The trigger for commencing instructions or an application may also require additional conditions be met. In another embodiment, motion of a user in front of the thin film display device may be detected via a proximity sensor or via detection of a user by the camera system. Detection a user's motion by a proximity sensor or the camera system may also trigger initiation by processor or microcontroller of executed instructions or an application similar to the above.

The flow proceeds to 920 where the information handling system commences an application program. In the present embodiment, this is done in response to a motion detection trigger as described above with respect to motion of the information handling system or proximity and motion of a user. Proceeding to decision diamond 930, a processor executing instructions for coordinating operation of the camera and display by the thin film display device determines the contextual environment operating on the information handling system. The contextual environment includes whether an application program or programs require camera usage and the type of camera usage. The type of anticipated camera usage may include taking still images, video, videoconference applications, image recognition, gaze detection, and other applications of the camera as described above.

If no camera usage is required, then the method ends. If camera usage is required, the flow proceeds to decision diamond 940 in this embodiment. At 940, the system determines whether the camera will be operating in still image mode. If so, the flow proceeds to 950 where the camera coordination system and method dim the backlighting or brightness of the designated camera zone area. At 960, the camera coordination system and method then reduces refresh rate of the camera zone to provide increased time for the camera to capture the target image through the outer field display layers of the camera zone. During this stage, the system may display a camera zone icon or camera zone location identification image. This is done to indicate to the user where on the thin panel display device the camera is located and draw attention of the user to that location for various camera functions as described.

If the image taking by the camera is not a still image mode, but instead a video mode or other camera operation mode, the flow proceeds from decision diamond 940 directly to 970. In the presently disclosed embodiment, the video mode or other mode may not implement a refresh rate reduction algorithm to make the camera zone display refresh rate asynchronous with the camera refresh rate when taking images. The system will instead make the camera zone, or some portion of the camera zone transparent during image capture. In other embodiments, a different refresh rate reduction algorithm may be implemented that is specific to each camera usage type.

At 970, the camera coordination system and method makes the outer display field layers of the camera zone transparent for image capture in the present embodiment. This will make the refresh rate effectively zero in that no image will be displayed in the camera zone, at least in the part that will serve as the lens region of the camera zone. This transparent camera zone may be temporary in certain embodiments for only the action of image taking by the camera behind the outer display field layers. In other embodiments it may sustain as long as camera usage persists.

The flow proceeds to decision diamond 980 where the camera coordination system or the camera controller system may determine whether the image being captured by the camera is too dark. If not, the flow ends and image capture may take place for the determined type of camera function such as still image, video, video conference, image recognition, or others as described herein or otherwise known uses for camera systems.

If the image or images to be captured is too dark, the flow proceeds to 985, where the camera coordination system and method of the present embodiment may coordinate the thin film display device drivers to enable greater brightness or even a flash mode to provide more light for the image capture for still images, video images, or other camera applications. The increased light or flash may be provided via the backlight control or via a brightness algorithm depending on the type of thin film display technology. For example, backlighting control would apply to an LCD display device. A brightness control algorithm would apply to AMOLED/OLED display devices in another example. It is understood that flash or lighting may be adjusted to desired levels set by a user or may be automatically adjusted based on settings of lighting quality for the camera system. Accordingly, the backlight or brightness control for flash mode or to provide additional lighting on the subject of image capture may be coordinated via the camera coordination system and methods described in the embodiments herein. Upon sufficient lighting being determined, the flow ends and the camera make take images with coordinated flash or lighting provided.

The system and methods described in the embodiments above may comprise processor executable instructions stored in computer-readable medium. The main memory unit 109 and disk drive unit 110 may include a computer-readable medium in which one or more sets of instructions such as software can be embedded. The disk drive unit 110 also contains space for data storage. Further, the instructions may embody one or more of the methods or logic as described herein. In a particular embodiment, the instructions may reside completely, or at least partially, within main memory 109, the static memory or disk drive unit 110, and/or within the processor chipset(s) 108 during execution by the system 10. The main memory 109 and the processor chipset 108 also may include computer-readable media. The network interface device 40 can provide connectivity to a network 50, (e.g. a wide area network (WAN)), a local area network (LAN), wireless network, or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium of main memory 109 and static memory or drive unit 110 that includes instructions or receives and executes instructions responsive to a propagated signal; so that a device connected to a network interface device 40 can communicate voice, video or data over the network 50. Further, the instructions may be transmitted or received over the network 50 via the network interface device 40.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a thin panel display device;
   a camera oriented behind an outer display field layer of the thin panel display device having a camera zone, wherein the aperture of the camera receives light passing through the outer display field layer camera zone;
   a processor detecting a software application operating on the information handling system wherein the software application has specific anticipated utilization of the camera and a camera driver to capture images;
   the processor determining a camera usage parameter specific to the anticipated utilization of the camera during ongoing operation of the software application for contextual refresh rate control; and
   the processor coordinating camera operation and thin panel display device operation through the outer display field layer in accordance with at least one camera usage parameter specific to the anticipated utilization of the camera during ongoing operation of the software application wherein the processor modifies a display refresh rate at the outer display field layer camera zone.

2. The system of claim 1, wherein the camera usage parameter includes an indication of still image capture or video capture may be utilized by the software application via the camera.

3. The system of claim 1, wherein coordinating camera operation and the thin panel display device operation through the outer display field layer includes reducing the display refresh rate at the camera zone in accordance with image taking via the camera.

4. The system of claim 1, wherein the outer display field layer of the thin panel display device is an organic light emitting diode (OLED) layer.

5. The system of claim 1, wherein coordinating camera operation and thin panel display device operation through the outer display field layer includes reducing brightness at the camera zone of the thin panel display device in accordance with image taking via the camera.

6. The system of claim 1, wherein coordinating camera operation and thin panel display device operation through the outer display field layer includes displaying a camera zone indicator image on the thin panel display device at the camera zone in accordance with image taking via the camera.

7. The system of claim 1, further comprising:
   the camera located at an edge of the thin panel display device having a minimum bezel; and
   the camera angled such that the camera aperture is directed toward a center location in front of the thin panel display device.

8. The system of claim 7, wherein the outer display field layer of the thin panel display device is a liquid crystal display (LCD) layer, further comprising:
   the processor controlling voltage to the camera zone of the thin panel display device such that a light angle through the liquid crystal of the outer display field layer is approximately aligned with the angle of the camera aperture.

9. A computer-implemented method of coordinating operations of a thin panel display device having a camera comprising:
   detecting a software application operating on the information handling system has specific anticipated utilization of the camera and a camera driver to capture images;
   determining, via a processor executing instructions, a camera usage parameter for the specific anticipated utilization of the camera and a camera driver to capture images by the software application and including contextual refresh rate control tailored to the software application specific anticipated camera utilization;
   controlling, via the processor, light passing through an outer display field layer of the thin panel display device to the camera oriented behind the outer display field layer;
   coordinating camera operation and thin panel display device operation through the outer display field layer in accordance with at least one camera usage parameter for the specific anticipated utilization of the camera by the software application wherein the processor modifies a display refresh rate at the outer display field layer.

10. The method of claim 9, wherein coordinating camera operation and thin panel display device operation through the outer display field layer includes reducing the display refresh rate of the thin panel display device in accordance with image taking via the camera.

11. The method of claim 9, further comprising:
    modifying the display refresh rate at a camera zone of the outer display field layer in accordance with image taking via the camera.

12. The method of claim 11, further comprising:
    reducing the display refresh rate at the camera zone of the outer display field layer to zero and maintaining transparency of the camera zone.

13. The method of claim 12, wherein the outer display field layer of the thin panel display device is a liquid crystal display (LCD) layer, further comprising:
    controlling light passing through an outer display field layer of the thin panel display device at the camera zone such that a light angle through the outer display field layer is approximately aligned with the angle of an aperture for the camera.

14. The method of claim 11, wherein coordinating camera operation and thin panel display device operation through the outer display field layer includes displaying a camera zone indicator image on the thin panel display device at the camera zone in accordance with image taking via the camera.

15. The method of claim 14, wherein displaying a camera zone indicator image on the thin panel display device at the camera zone in accordance with image taking via the camera includes a drop-down menu providing access to camera setting adjustments responsive to input at the camera zone indicator image.

16. An information handling system comprising:
    a thin panel display device;
    a camera oriented behind an outer display field layer of the thin panel display device having a camera zone, wherein the aperture of the camera receives light passing through the outer display field layer camera zone;
    a processor detecting a software application operating on the information handling system and determining a camera usage parameter for a specific anticipated utilization of the camera and a camera driver to capture images by the software application and including contextual refresh rate control tailored to the software application specific anticipated camera utilization; and the processor coordinating camera operation and thin panel display device operation through the outer display field layer in accordance with at least one camera usage parameter for the specific anticipated utilization of the camera and the camera driver to capture images wherein the processor asynchronously reduces a display refresh rate at the camera zone in accordance with image taking via the camera at the camera zone.

17. The system of claim 16, wherein the outer display field layer is a liquid crystal display (LCD) layer, further comprising:

the processor reducing display backlighting at the camera zone of the thin panel display device in accordance with image taking via the camera.

18. The system of claim 16, further comprising:

the thin film display device displaying a camera zone indicator image on the thin panel display device at the camera zone in accordance with image taking via the camera.

19. The system of claim 16, wherein the outer display field layer of the camera zone further comprises a thinner semi-transparent zone along an outer edge of the thin film display device.

20. The system of claim 19, further comprising:

the camera angled such that the camera aperture is directed toward a center location in front of the thin panel display device.

* * * * *